United States Patent [19]
Collins et al.

[11] Patent Number: 4,945,560
[45] Date of Patent: Jul. 31, 1990

[54] TELEPHONE NETWORK INTERFACE APPARATUS

[75] Inventors: Thomas J. Collins, Wall Township, Monmouth County; Peter Quintana, Brick, both of N.J.

[73] Assignee: Keptel, Inc., Tinton Falls, N.J.

[21] Appl. No.: 406,850

[22] Filed: Sep. 13, 1989

Related U.S. Application Data

[63] Continuation-in-part of Ser. No. 187,935, Apr. 29, 1988, abandoned.

[51] Int. Cl.⁵ .............................................. H04M 9/00
[52] U.S. Cl. .................................. 379/399; 361/356; 379/412
[58] Field of Search .............................. 174/65 R, 65 G; 379/399, 329, 328, 325, 326, 327, 330, 332, 331, 442, 441, 412; 361/356, 426, 56, 119; 439/133, 134, 135, 136, 142, 143, 144, 715, 718

[56] References Cited

U.S. PATENT DOCUMENTS

| | | | |
|---|---|---|---|
| 4,575,169 | 3/1986 | Duplatre et al. | 174/65 G |
| 4,658,422 | 4/1987 | Sparks | 379/442 |
| 4,712,232 | 12/1987 | Rodgers | 379/329 |
| 4,731,501 | 3/1988 | Clark et al. | 361/356 X |
| 4,749,359 | 6/1988 | White | 439/133 |
| 4,782,427 | 11/1988 | Marks | 361/426 |

OTHER PUBLICATIONS

"SNI-5000", Keptel, Ocean, NJ, Oct. 1985, [379-399].
"ML-5", Keptel, Ocean, NJ, Apr. 1986, [379-399].

Primary Examiner—Jin F. Ng
Assistant Examiner—Randall S. Vaas
Attorney, Agent, or Firm—R. Gale Rhodes, Jr.

[57] ABSTRACT

Telephone network interface apparatus including an enclosure providing a splice chamber for receiving a telephone network cable including a plurality of incoming telephone lines, and providing a terminal chamber having a plurality of telephone terminals mounted therein; a plurality of individual, replaceable subscriber line interface modules are mounted on the enclosure, each module includes an interface jack, a subscriber wiring bridge including a pair of subscriber terminals, an interface plug connected to the subscriber terminals for being removably received within the interface jack, and each module provides an internal space for receiving a telephone circuit, the interface jack is for being connected to one of the telephone terminals and thereby to one of the incoming telephone lines and the subscriber terminals are for being connected to a subscriber premises line, upon the interface plug being removed from the interface jack a demarcation point being provided between the one telephone line and the subscriber premises line whereby the plug of an operating telephone may be plugged into the interface jack to facilitate determination of whether a fault exists on the incoming telephone line or the subscriber premises line.

12 Claims, 8 Drawing Sheets

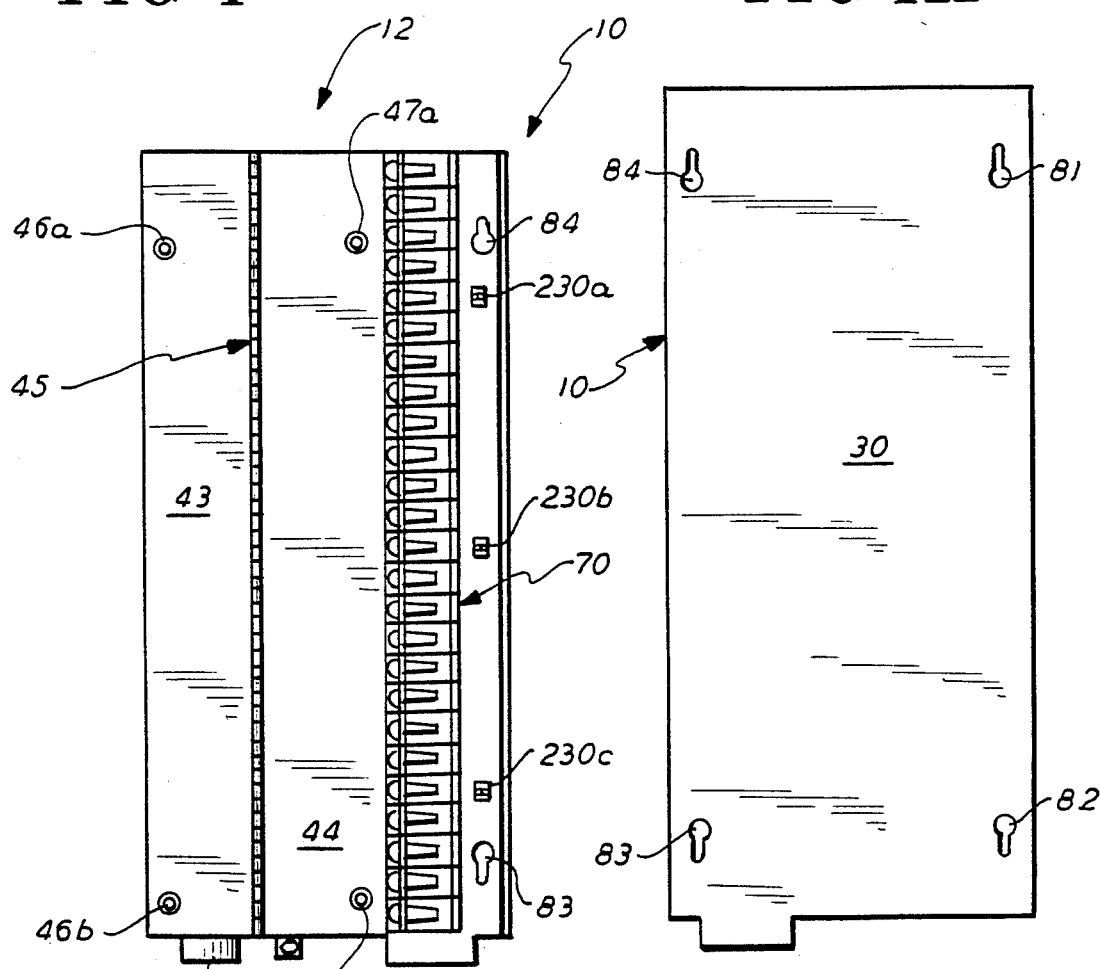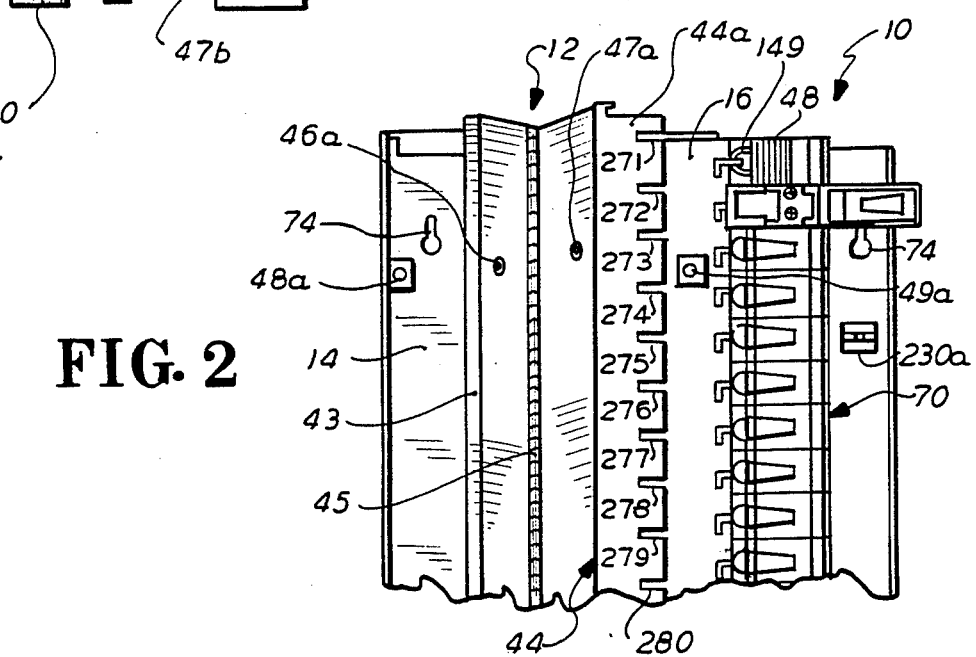

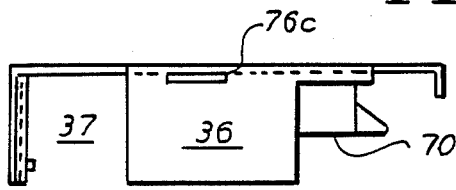
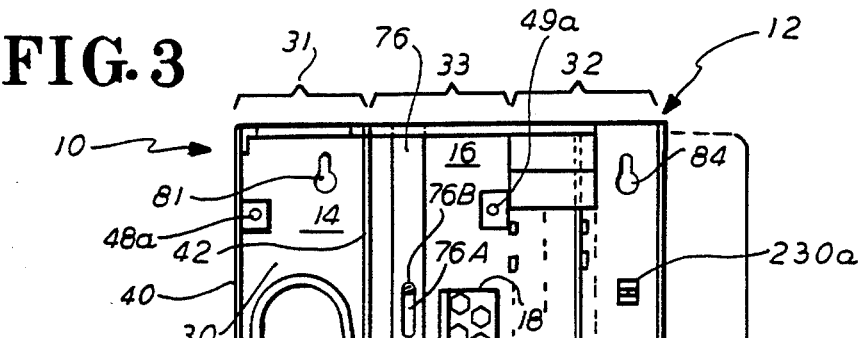
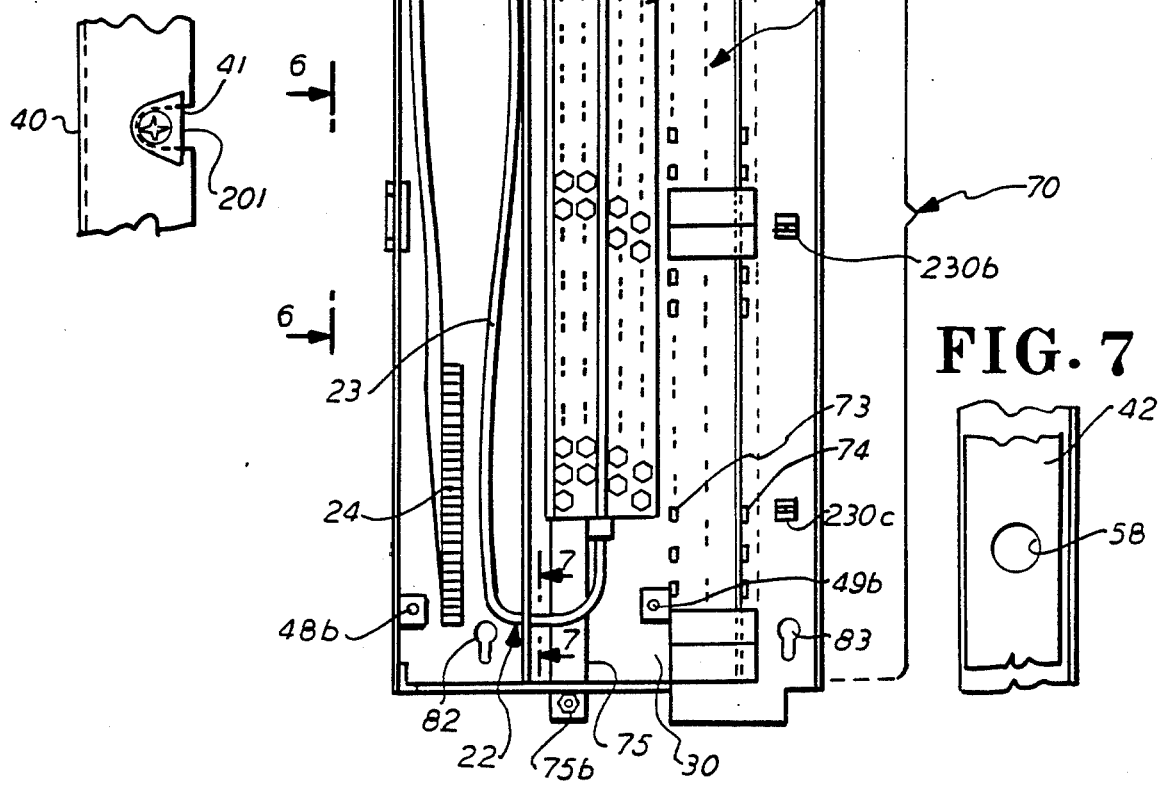
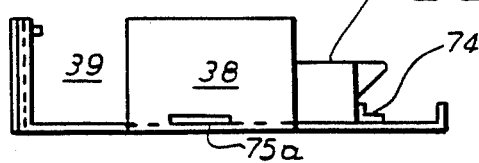

TELEPHONE NETWORK INTERFACE APPARATUS

This application is a continuation of application Ser. No. 187,935, filed Apr. 29, 1988, now abandoned.

BACKGROUND OF THE INVENTION

This invention relates generally to new and improved telephone network interface apparatus for providing interconnections between a plurality of incoming telephone lines and a plurality of subscriber premises lines and for providing demarcation points therebetween to facilitate determination of whether a fault exists on an incoming telephone line or an associated subscriber premises line. It being understood by those skilled in the art that, since the deregulation of the telephone industry and divestiture of portions of the Bell System, such demarcation points are now mandated.

As is known to those skilled in the art, such telephone network interface apparatus are typically installed or mounted on a support surface such as a wall, or the like, by personnel typically referred to as construction and engineering personnel who also install or attach to the telephone network interface apparatus a typically large and heavy telephone network cable including a large number of incoming telephone lines or pairs, for example, a 50 line or pair cable, a 100 line or pair cable, a 200 line or pair cable, etc. As is further known, such construction or engineering personnel also typically perform a work task generally referred to in the art as "cable splicing" wherein a certain number of the incoming telephone lines or pairs included in the telephone network cable are separated or "spliced out" or "dropped off" at the telephone network interface apparatus. Such work tasks performed by the construction and engineering personnel are generally considered to be heavy duty work tasks and construction and engineering personnel tend to be rugged individuals or personnel. Thereafter, typically and as is further known to those skilled in the art, personnel typically referred to as installation and maintenance personnel perform the work tasks of interconnecting the "spliced out" or "dropped off" incoming telephone lines or pairs to telephone terminals, interconnecting small and light individual telephone wires or pairs between the telephone terminals and a plurality of subscriber terminals, and interconnecting the small and light individual subscriber premises lines or pairs to the subscriber terminals. Such work tasks performed by the maintenance and installation personnel are generally considered to be light duty work tasks and maintenance and installation personnel tend to be of the less rugged individuals or personnel. Accordingly, it has been found that it is undesirable to permit the more rugged construction and engineering personnel to have access to, typically, the telephone terminals, subscriber terminals, subscriber premises lines or pairs and the smaller wires providing interconnections therebetween. Thus, there exists a need in the art for telephone network interface apparatus which compartmentalizes or physically separates the portion of the telephone network interface apparatus to which the more rugged construction engineering personnel must have access to perform their heavy duty work tasks and which compartmentalizes or physically separates the portion of the telephone network interface apparatus to which the less rugged installation and maintenance personnel must have access to perform their relatively light duty work tasks, so as to deny the construction and engineering personnel access to the telephone terminals, subscriber terminals, subscriber premises lines or pairs, and their interconnecting wires to prevent them from unintentionally or inadvertently damaging the telephone terminals, subscriber terminals, subscriber premises lines or pairs, and their interconnecting wires.

As is further known to those skilled in the art, fire is of concern with telephone network interface apparatus and fire typically enters such apparatus along the incoming telephone network cable. Accordingly, there exists a further need for such compartmentalization for the sake of fireproofing or fire retarding the portion of the telephone network interface apparatus receiving subscriber premises terminals from one portion receiving the incoming telephone network cable.

Further, as known to those skilled in the art, due to considerations of cost and maximum applicability to the largest number of subscriber installations possible for a single telephone network interface apparatus such telephone network interface apparatus are limited to the number of incoming telephone lines and subscriber premises lines which may be handled by any specific telephone network interface apparatus. In spite of this limitation, as is further known, there exists some subscriber premises installation applications which require the service of a larger number of incoming telephone lines and subscriber premises lines than the specific network interface apparatus can handle. Accordingly, to avoid the cost of providing larger and more costly telephone network interface apparatus of greater line handling capacity but of limited application, there exists a need in the art for telephone network interface apparatus, a plurality of which may be installed adjacent to each other at a single subscriber premise and which different apparatus may be interconnected with different incoming telephone lines of a single large telephone network cable of the large number of lines or pairs noted above.

As is further known to those skilled in the art, prior art telephone network interface apparatus exist which include individual, replaceable, subscriber line interface modules which, upon the occurrence of a non-function in a single component of the module, permits such modules to be replaced or discarded on an individual module basis thereby avoiding the cost of discarding a larger portion of a telephone network interface apparatus, if not the entire apparatus itself.

Accordingly, it has been found that there exists a need in the telephone network interface apparatus art for new and improved telephone network interface apparatus which provides, in combination, the above-noted compartmentalization between the portions of the telephone network interface apparatus to which the construction engineering personnel must have access and the portions of the telephone network interface apparatus to which the installation and maintenance personnel must have access, and a plurality of which telephone network interface apparatus may be mounted adjacent each other for interconnection with different incoming telephone lines of a telephone network cable including a large number of incoming telephone lines, and which telephone network interface apparatus includes a plurality of the above-noted individual, replaceable, subscriber line interface modules.

SUMMARY OF THE INVENTION

The object of the present invention is to satisfy the above-noted needs in the telephone network interface apparatus art.

Telephone network interface apparatus embodying the present invention and satisfying such needs may include an enclosure providing a splice chamber for receiving a telephone network cable including a plurality of incoming telephone lines, and providing a terminal chamber for having a plurality of telephone terminals mounted therein; and a telephone network interface section for having a plurality of individual, replaceable subscriber line interface modules mounted thereon, each module includes an interface jack, a subscriber wiring bridge including a pair of subscriber terminals, an interface plug connected to the subscriber terminals for being removably received within the interface jack, and each module provides an internal space for receiving a telephone circuit, the interface jack is for being connected to one of the telephone terminals and thereby to one of the incoming telephone lines and the subscriber terminals are for being connected to a subscriber premises line, upon the interface plug being removed from the interface jack a demarcation point being provided between the one telephone line and the subscriber premises line whereby the plug of an operating telephone may be plugged into the interface jack to facilitate determination of whether a fault exists on the incoming telephone line or the subscriber premises line; the enclosure further includes a pivotally mounted splice chamber door and a terminal door for respectively covering the splice chamber and the terminal chamber; respective fastening means are provided for fastening the doors over the splice chamber and the terminal chambers to deny access to the chambers except for telephone company personnel; and mounting means are provided for mounting the telephone network interface apparatus on a support surface such as a wall or the like.

A plurality of such telephone network interface apparatus may be "stacked," i.e. a plurality of such apparatus may be mounted vertically or horizontally to provide increased line capacity handling; such apparatus being structured to facilitate such "stacking."

BRIEF DESCRIPTION OF THE DRAWINGS

FIG. 1 is a front elevational view of telephone network interface apparatus embodying the present invention;

FIG. 1A is a rear elevational view of such apparatus;

FIG. 2 is a partial view of such apparatus showing the splice chamber door and terminal door in the open positions;

FIG. 3 is a diagrammatical, front elevational view of the apparatus with the splice chamber and terminal doors removed to show the structure residing behind the doors;

FIG. 4 is a bottom end view of the apparatus;

FIG. 5 is a top end view of the apparatus;

FIG. 6 is a partial side view of the apparatus taken in the direction of the arrows 6—6;

FIG. 7 is a partial view of a portion of an internal wall taken in the direction of the arrows 7—7;

DETAILED DESCRIPTION OF THE PREFERRED EMBODIMENT

Figure 8:
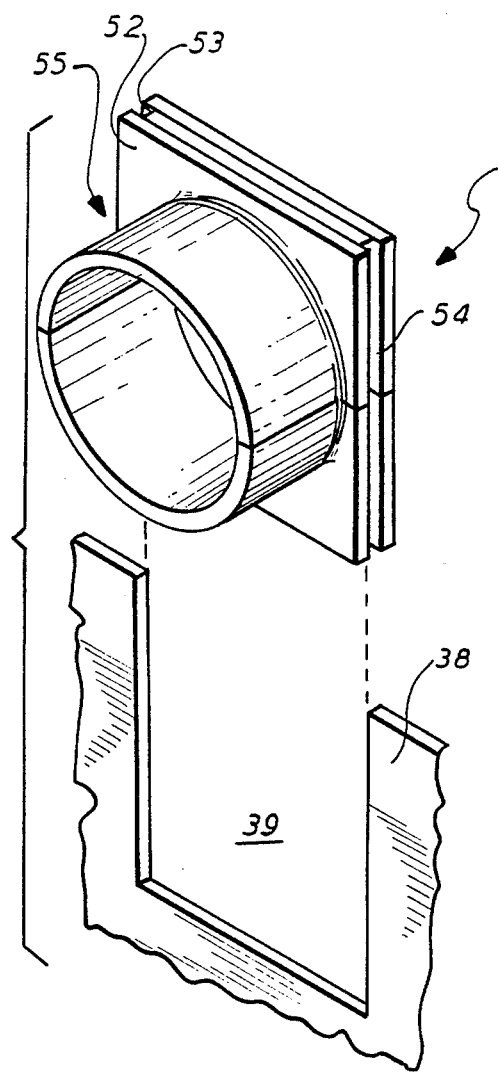
FIG. 8 is a composite view, in perspective, illustrating the insertion of a reversible, split, telephone network cable guide into its associated opening.

Referring now to the drawings, in particular to FIGS. 1–3, there is shown telephone network interface apparatus embodying the present invention and indicated by general numerical designation 10; in the embodiment shown, the telephone network interface apparatus is a 25 line or pair apparatus, but it will be understood that such is merely a specific embodiment of the present invention and that the present invention is limited solely by the appended claims. Generally, apparatus 10 includes an enclosure indicated by general numerical designation 12, FIGS. 1 and 2, which enclosure, FIG. 3, provides a splice chamber 14 for receiving a telephone network cable 15 (FIGS. 11 and 12) including a plurality of incoming telephone lines, and which enclosure 12 also provides a terminal chamber 16 having a protector 18, such as a suitable lightning protector or arrestor, and a plurality of telephone terminals, indicated by general numerical designation 20, mounted therein; however, it will be understood that although the present description of the preferred embodiment is that of a "protected terminal," i.e. telephone terminals provided with, e.g. lightning arrestors, "unprotected terminals" are also within the scope of the present invention, i.e. telephone terminals without such protection. When embodiment as a "protected terminal," the apparatus 10 includes a connector indicated by general numerical designation 22 (FIG. 3), which connector 22 may include a protector cable stub 23 and a splice connector 24 for interconnecting the plurality of telephone terminals 20 with the incoming telephone lines or pairs (25 in this embodiment) "spliced out" or "dropped off" at the apparatus 10 in splice chamber 14; in the specific embodiment it will be understood that the cable stub 23 includes 25 pairs of connectors and that the splice connector 24 will be provided with 25 pairs of connecting pins. When embodied as an "unprotected terminal", it will be understood that the connector 22 typically will not be utilized and instead the incoming telephone lines "spliced out" typically will be connected directly to the telephone terminals 20.

The enclosure 12 also provides or includes a network interface section, indicated in FIG. 3 by general numerical designation 17, for having a plurality of individual, replaceable subscriber line interface modules mounted thereon, such plurality of modules being indicated by general numerical designation 70 and described in detail below.

With regard to the structure of the enclosure 12, it will be understood that the enclosure 12 includes a generally rectangular shaped backplate 30, FIG. 1A, which may be divided generally, as indicated by the brackets at the top of FIG. 3, into a left lateral portion 31, a right lateral portion 32, and an intermediate portion 33. The enclosure 12 includes a top wall 36, FIG. 5, generally spanning the left lateral portion 31 and intermediate portion 33 of the backplate 30, and which top wall 36 is provided with an opening 37. In addition, the enclosure 12 includes a bottom wall 38, FIG. 4, generally spanning the left lateral portion 31 and intermediate portion 33 of the backplate 30 and which bottom wall 38 is provided with an opening 39. Further, the enclosure 12 includes a side wall 40 provided with an opening 41 (FIG. 6) and an internal wall 42 which is parallel to and spaced from the side wall 40 as shown in FIG. 3; the internal wall 42 extends generally along the line of demarcation between the left lateral portion 31 of the backplate 30 and the intermediate portion 33 of the backplate 30 as may be noted from FIG. 3. With regard to the above-noted splice chamber 14, it will be understood that the side wall 40, internal wall 42, the left lateral portion 31 of the backplate 30, the portion of the top wall 36 spanning the left lateral portion 31 of the backplate 30, and the portion of the bottom wall 38 spanning the left lateral portion 31 of the backplate 30, cooperatively provide the splice chamber 14. It will be further understood that the internal wall 40, intermediate portion 33 of the backplate 30, the portion of the top wall 36 spanning the intermediate portion 33 of the backplate 30 and the portion of the bottom wall 38 spanning the intermediate portion 33 of the backplate 30 cooperatively provide the terminal chamber 16. The right lateral portion 32 provides the network interface section 17. The lower portion of the internal wall 42 is provided with an opening 58 (FIG. 7) for permitting passage therethrough of the cable stub 23 of FIG. 3 when embodied as a "protected terminal," and for permitting passage therethrough of the incoming telephone lines "spliced out" upon being embodied as an "unprotected terminal."

Figure 24:
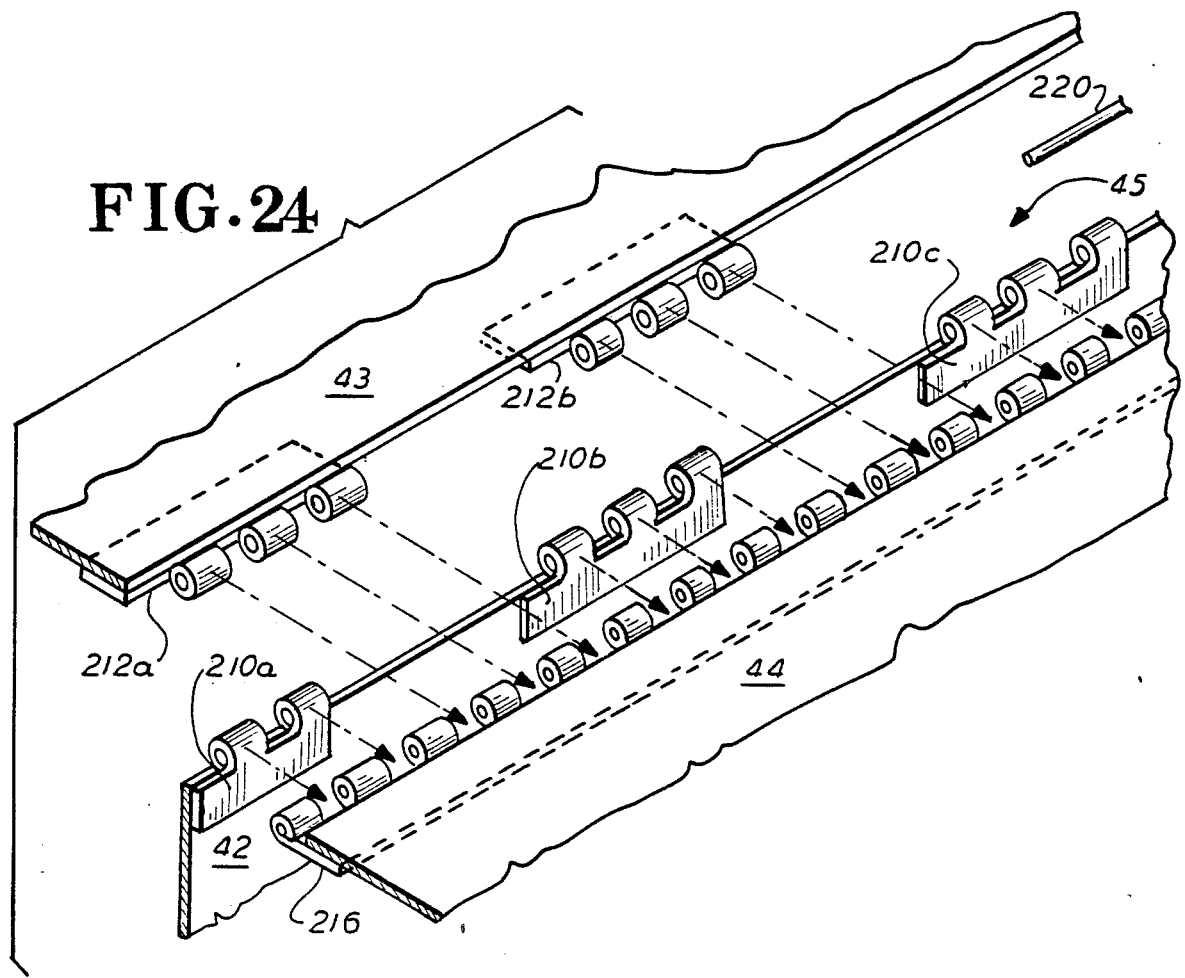
FIG. 24 is an exploded partial view, in perspective, showing the common hinging of the splice chamber and terminal chamber doors.

To further compartmentalize or physically separate the splice chamber 15 and terminal chamber 16 for the above-noted purpose, in addition to the internal wall 42, a splice chamber door or cover 43 and a terminal chamber door or cover 44 are provided, as shown in FIGS. 1 and 2, both of which are mounted pivotally at the top of the internal wall 42 by the dual hinging structure indicated by general numerical designation 45 in FIG. 1 and shown in detail in FIG. 24. To deny access to the splice and terminal chambers except to telephone company personnel, the doors or covers 43 and 44 are provided with fasteners such as threaded bolts 46a and 46b and 47a and 47b, respectively, as shown in FIG. 1. The heads of such bolts are of a size and/or shape that they require a tool typically not found in the possession of a subscriber but typically found in the possession of telephone company personnel, or a special tool provided to telephone company personnel. As shown in FIG. 3, the threaded bolts respectively engage correspondingly positioned studs 48a and 48b (not shown) and 49a and 49b to fasten the respective covers or doors to the enclosure 12; as will be understood from FIG. 3, the studs are provided with threaded holes for receiving the threaded bolts and the studs 46a and 46b are provided on, or extend inwardly from, the side wall 40 and the studs 47a and 47b are provided on, or extend upwardly from, the backplate 30. It will be understood that although the construction and engineering personnel and the maintenance and installation personnel, both typically telephone company personnel, may have the same tool which will open both the splice chamber door 43 and the terminal chamber door 44, the above-noted and desired compartmentalization or physical separation is still provided because the construction and engineering personnel need open only the splice chamber door 43 to gain access to the portion of the telephone network apparatus to which they must have access to perform their above-noted comparatively heavy duty work tasks.

Figure 9:
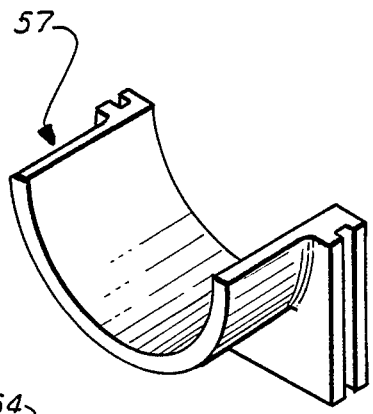
FIG. 9 is a perspective view of the lower half of the reversible, split telephone network cable guide.
Figure 8A:
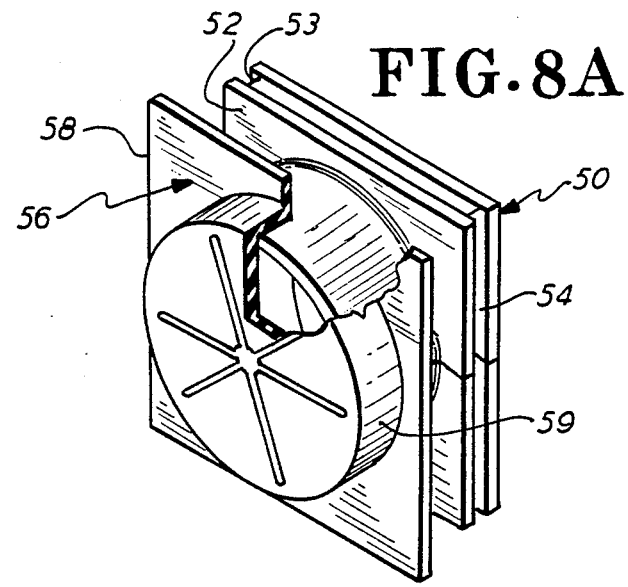
FIG. 8A is an enlarged view, in perspective, of a grommet mounted on the end of the telephone network cable guide of FIG. 8.

Referring again to FIG. 4, it will be understood that the opening 39 is for permitting entrance of the telephone network cable 15 (FIGS. 11 and 12) into the splice chamber 14 to have a plurality, 25 in the present embodiment, "spliced out" or "dropped off" in the splice chamber. It will be further understood, and referring now to FIGS. 8 and 9, that the telephone network interface apparatus 10 further includes a reversible split telephone network cable guide 50 for insertion into and occupation of the opening 39 in the bottom wall 38 (FIG. 4) to guide the telephone network cable 15 into the splice chamber 14. It will be understood that the cable guide 50, FIG. 8, includes an outer rectangular portion 52 complementary in shape to the opening 39 and is provided with opposed inwardly extending grooves 53 and 54 for receiving the portion of bottom wall 38 defining the opening 39 (FIG. 4) to secure the cable guide 50 in the opening 39. The cable guide further includes a cylindrical portion 55 for surrounding and guiding the telephone network cable 15 into the splice chamber. It will be understood that the cable guide 50 is reversible and is shown in FIGS. 1 and 8 in the position that it occupies when performing its cable guide function; it will be understood that the cable guide 50 is reversible to extend the cylindrical portion 55 into the splice chamber to facilitate storage, shipping, and the like of the apparatus 10. As may be further understood from FIGS. 8 and 9, the cable guide is split into two halves, bottom half 57 being shown in FIG. 9, generally longitudinally to permit the cable guide halves to be separated to surround the telephone network cable 15. The cable guide 50 may be provided with a grommet 56, FIG. 8A, including a rectangular portion 58 and a cylindrical portion 59 for receiving the end of the cylindrical portion 55 of the guide 50. The face of the grommet cylindrical portion 59 may be split along the lines shown in FIG. 8A for opening and upon vertical stacking of the telephone network interface apparatus of the present invention as shown in FIG. 11, the grommet 56 is inserted into the opening 37 provided in the top wall 36 of the telephone network interface apparatus mounted below.

Figure 10:
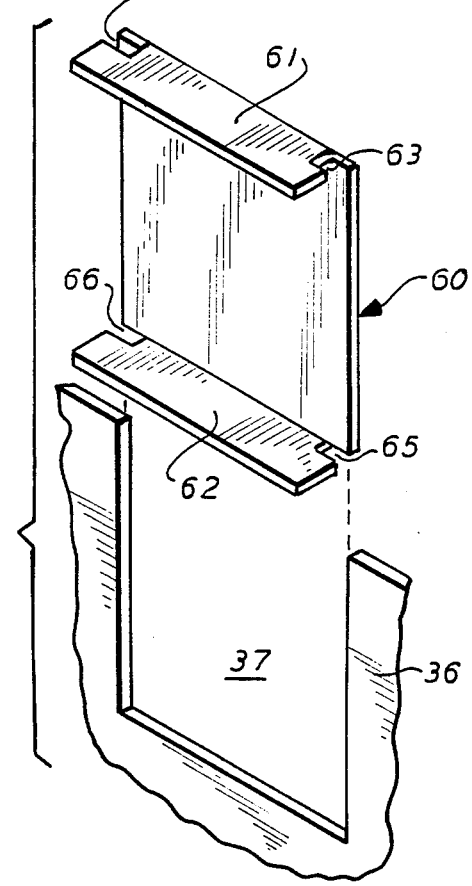
FIG. 10 is a composite view, in perspective, illustrating the insertion of the splice chamber end plate into its associated opening.
Figure 11:
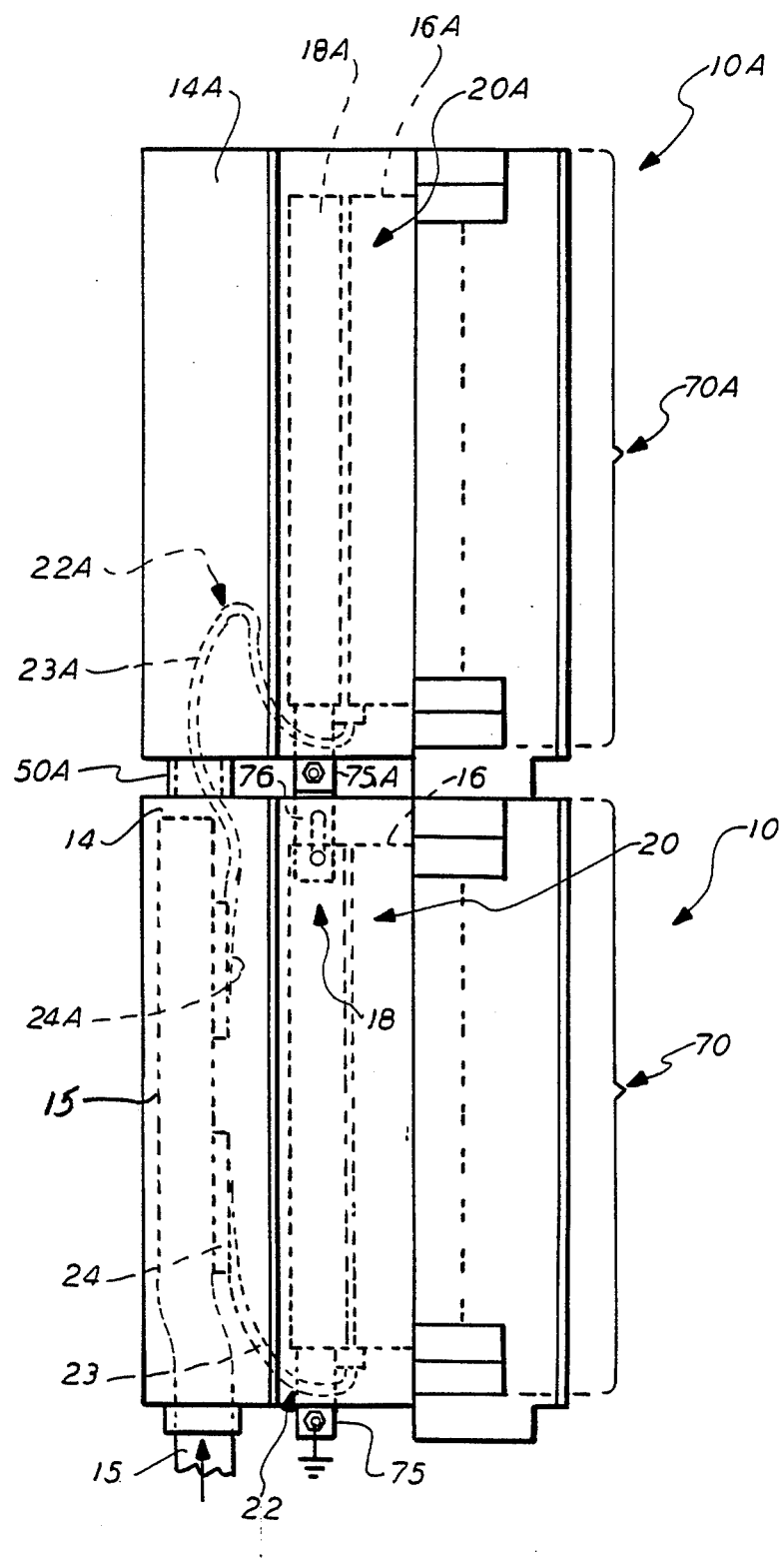
FIG. 11 is a diagrammatical, front elevational view of two telephone network interface apparatus embodying the present invention mounted vertically with respect to each other for interconnection with different incoming telephone lines of a single telephone network cable including a large number of incoming telephone lines.
Figure 12:
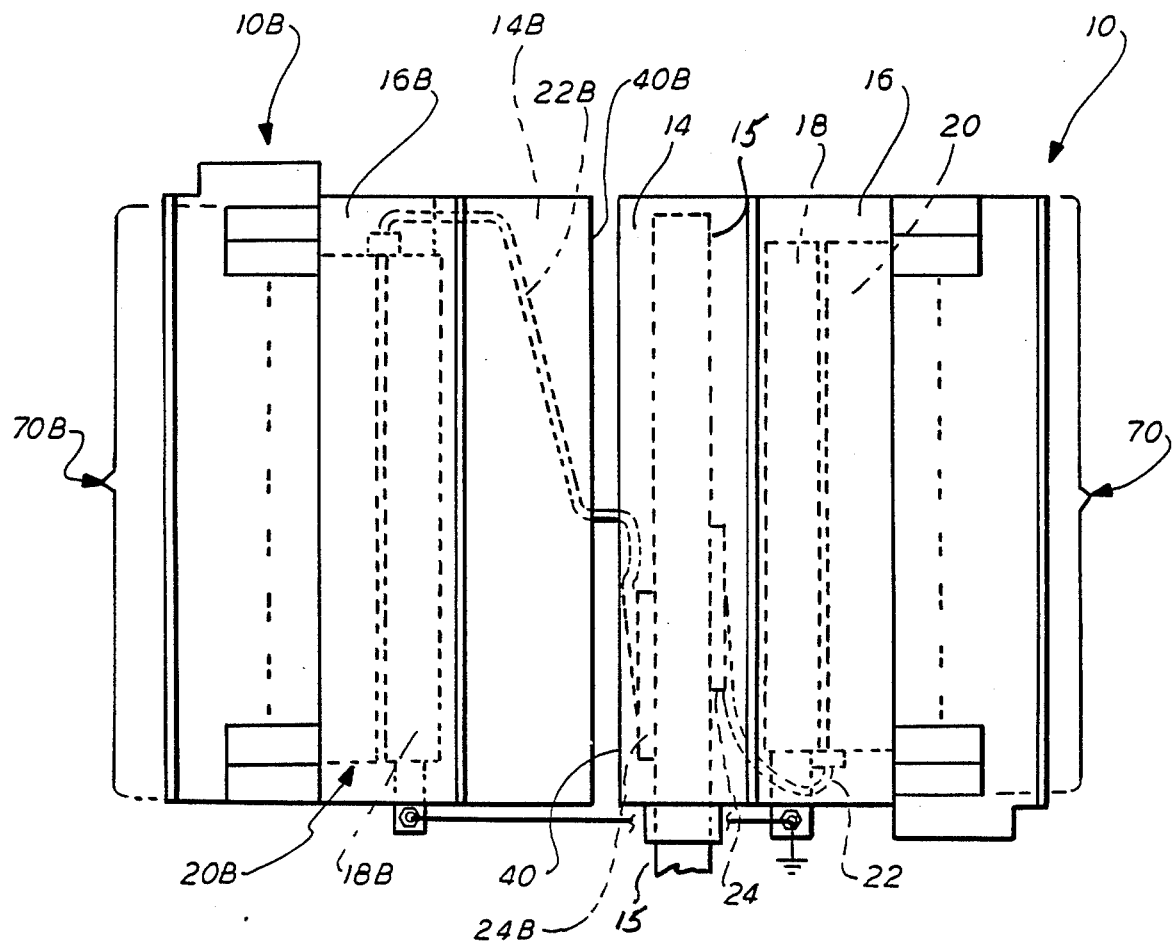
FIG. 12 is a diagrammatical illustration of a pair of telephone network interface apparatus embodying the present invention mounted horizontally with respect to each other for interconnection with different incoming telephone lines of a single telephone network cable including a large number of incoming telephone lines.

Ordinarily, upon the telephone network interface apparatus 10 being installed and used separately at a subscriber location, and not being stacked vertically as illustrated in FIG. 11 or horizontally as illustrated in FIG. 12 to provide greater capacity at a single subscriber's premises than a single apparatus 10 can provide, the opening 37 (FIG. 5) provided in the top wall 36 is closed by an end plate 60, FIG. 10, generally complementary in shape to and for insertion into and closing of the opening 37. The end plate 60 is provided with inwardly extending members 61 and 62 provided, respectively, with inwardly extending slots or grooves 63 and 64 and 65 and 66 for receiving the portion of top wall 36 defining the opening 37, to secure the end plate in the opening 37.

The telephone network interface apparatus 10 further includes a plurality (25 in this embodiment) of individual, replaceable subscriber line interface modules indicated by general numerical designation 70 which modules are mounted on the right lateral portion 32, or network interface section 17, of the backplate 30 as may be best noted by reference to FIGS. 1 and 2; right lateral portion 32 is also provided with a plurality of module mounting members 73 and 74 (FIG. 3), for removably mounting each module individually. Each module of plurality 70 may be the individual, replaceable subscriber line module 91 shown in detail in FIGS. 7-10 and 12-18 of co-pending but not presently allowed U.S. patent application Ser. No. 07/139,590, filed Dec. 30, 1987, entitled TELEPHONE NETWORK INTERFACE APPARATUS, and assigned to the same assignee as the present application. For completeness of disclosure of the present application, FIGS. 7-10 and 12-18 of co-pending but not presently allowed application Ser. No. 07/139,590 are shown in the present drawings as FIGS. 13-23, and for convenience of reference the structure shown therein will be described below using the same reference numbers as used in the FIGS. of the co-pending application, the only change being a modification of the security staple 150. Referring now to FIGS. 13-23, the structure of the replaceable individual subscriber line modules of plurality 70 may be understood by reference to FIGS. 13-16 wherein the structure of representative module 91 is shown in detail. Module 91 is a generally rectangular, substantially hollow box-like structure including a top 92, bottom 93, opposed sides 94 and 95 and opposed first and second ends 96 and 97; the structure, as shown in FIG. 14, provides an internal space 98 for receiving a telephone circuit, sometimes referred to in the art as station electronics, such as, for example, a maintenance terminating unit, half ringer or the like, suitably interconnected electrically in the manner also known to the art. The pair of subscriber wiring terminals 81 are provided on the module top 92, FIG. 13, and are for being connected to an individual subscriber line (e.g. tip and ring wires) of the subscriber premises wiring. A plug 101 is connected to the pair of subscriber terminals 81 by the electrical conductors 103, and the plug is for being removably plugged into a jack 105 also mounted on the module top 92; the jack 105 is provided with electrical connectors 107 for connecting the jack with pair of the telephone terminals 20 shown, in FIG. 3. The jack 105 is for removably receiving the plug 101 to interconnect the individual subscriber line connected to the terminals 81 to the telephone company wiring connected to a pair of telephone terminals 20 to provide interconnection therebetween, and the plug 101 is for being removed from the jack 105 to provide a demarcation point between the individual subscriber line and the telephone company wiring and, upon the plug 101 being removed from the jack 105, the jack is for receiving an operating telephone plug (not shown) to determine whether a fault exists on the subscriber premises wiring or the telephone company wiring.

Figure 15:
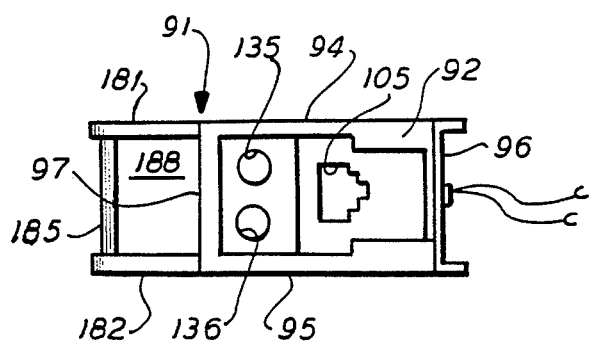
FIG. 15 is a top view of the replaceable individual subscriber line module of FIGS. 13 and 14 but with the replaceable subscriber wiring bridge and plug/cable being removed.
Figure 16:
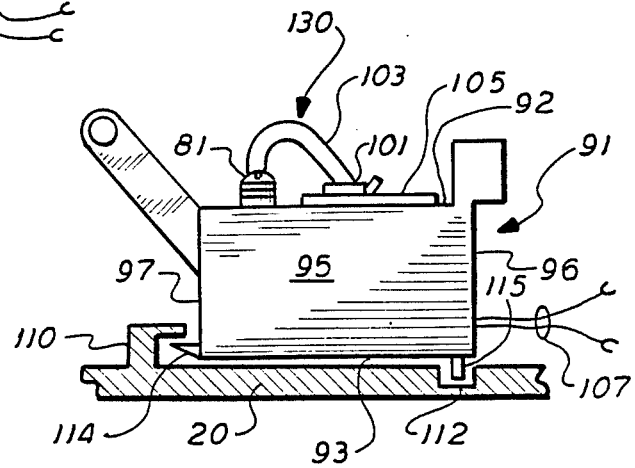
FIG. 16 is a side view of the replaceable individual subscriber line module of FIG. 13.
Figure 23:
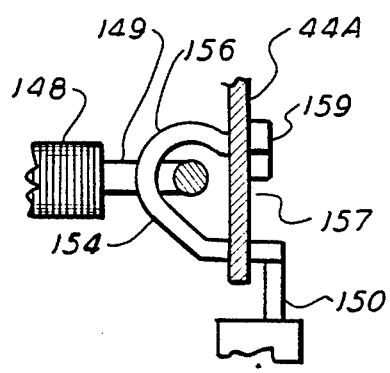
FIG. 23 is a partial side view, partially in cross-section, showing the cooperating means for locking the security cover of the alternate embodiment replaceable individual subscriber line module to deny access to other suscribers.

A better understanding of the modularity, i.e. replaceability and removable mounting of the individual subscriber line modules of plurality 70, may be obtained by reference to FIG. 16 wherein it will be noted that the bottom 20 of the base 12 shown (analogous to right lateral portion 32 of the backplate 30 of FIG. 3) is provided with an upwardly extending inverted L-shaped member 110 and an inwardly extending hole 112 and that the module 91 is provided with an outwardly extending member 114 and a downwardly extending member 115. For removable mounting of the module to the base, the outwardly extending member 114 is wedgedly received under the inverted L-shaped member 110 and the downwardly extending member 115 is received within the hole 112; as may be understood from FIG. 3, the right lateral portion 32 of backplate 30 is provided with a plurality of holes 73 and upwardly extending members 74, analogous to hole 112 and member 110 of FIG. 16 for removably mounting the plurality of individual subscriber line modules 70. Thus, it will be understood that the individuality and removable mounting of the individual subscriber line modules 70 permit each individual module to be replaced, one at a time, in the event that any component of the module becomes non-functional while retaining the balance of the telephone network interface apparatus 10. More particularly, and by way of example, should any component of the individual subscriber line module 91 (FIGS. 13-16) become non-functional, the subscriber line may be disconnected from the wire screw terminals 81, the electrical connectors 107 disconnected from the telephone terminals and the individual subscriber line module 91 removed from the apparatus 10 by pulling up on the first end of the module 91 (FIG. 16) to pull the downwardly extending module member 115 from the hole 112 provided in the bottom 20 and to thereafter unwedge the outwardly extending module member 114 from the inwardly extending inverted L-shaped member 110 provided on the apparatus bottom 20.

Figure 13:
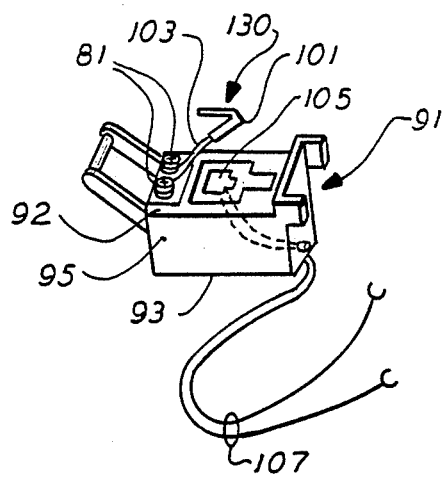
FIG. 13 is a perspective view of a replaceable individual subscriber line module which may be embodied in the present invention and including a replaceable subscriber wiring bridge and plug/cable.
Figure 14:
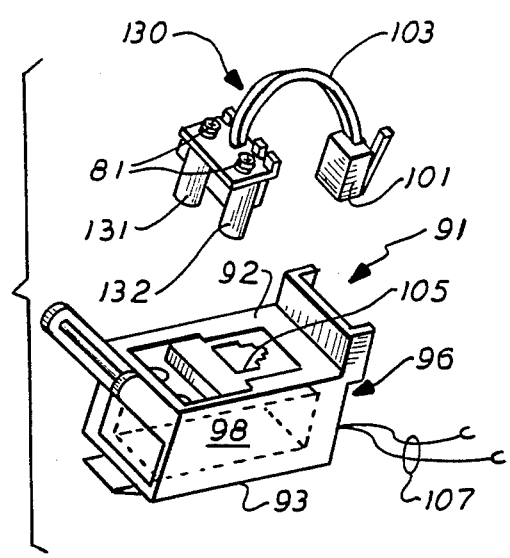
FIG. 14 is an exploded view of the replaceable individual subscriber line module of FIG. 13.

It will be further understood that even further modularity is provided to the replaceable individual subscriber modules of plurality 70, and hence to the telephone network interface apparatus 10, by embodying the subscriber line terminals as a replaceable wiring bridge plug/cable, such as the individual replaceable wiring bridge plug/cable indentified by general numerical designation 130 shown in FIGS. 13, 14 and 16 and with regard to representative module 91. More particularly, the individual replaceable wiring bridge 130 includes a pair of generally cylindrical members 131 and 132 (FIG. 14) having the pair of subscriber screw wire terminals 81 mounted thereon and the plug 101 and interconnecting conductors or cable 103. The module 91, FIGS. 14 and 15, is provided intermediate the top 92 and bottom 93 with a pair of cylindrical openings or holes 135 and 136 complementary in shape to and for wedgedly receiving the pair of cylindrical members 131 and 132 for removably mounting the individual subscriber wiring bridge 130 in the module 91. This further individuality and modularity of the bridge 130 has been found to be further advantageous since it has been found that most typically it is not the subscriber line terminals 81 which become non-functional in the individual subscriber line modules but instead, typically, it is other components of the replaceable individual subscriber line modules which become non-functional such as, for example, a telephone circuit received within the internal space 98 (FIG. 14) of an individual module. Hence, upon, for example, such telephone circuit becoming non-functional, the entire replaceable individual subscriber line module 91 need not be discarded, and instead the individual replaceable subscriber wiring bridge 130 may be removed from the module while the individual subscriber line remains connected to the terminals 81 and the remaining module discarded while retaining and saving the wiring bridge 130.

Figure 21:
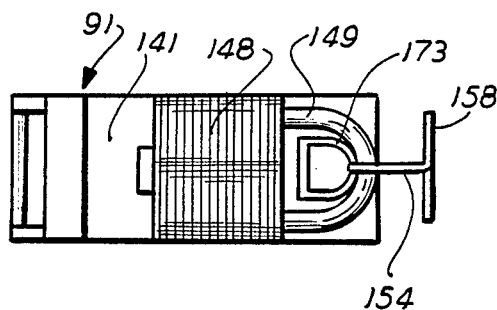
FIG. 21 is a top view of the replaceable individual subscriber line module of FIGS. 17, 18 and 19 showing a locked padlock positioned on top thereof.
Figure 22:
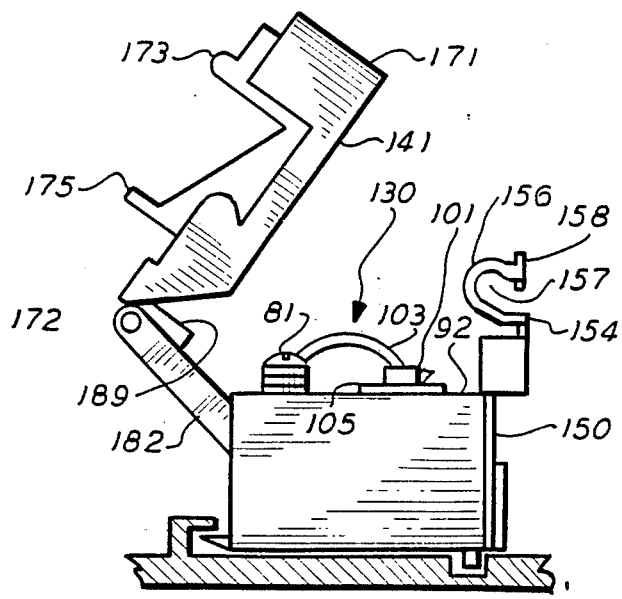
FIG. 22 is a side view of the replaceable individual subscriber line module of FIGS. 17 and 18 showing the security cover in the unlocked and open position.

Each individual, replaceable subscriber line module of plurality 70 may be provided if desired with an individual security cover and, referring to FIGS. 17–22, and to representative individual subscriber module 91 shown therein, the module is provided with the individual security cover 141 mounted pivotally on the second end 97 of the module which security cover is specifically for covering the pair of subscriber wiring terminals 81, plug 101 and jack 105 (FIG. 22). Generally, it will be understood further that the module, e.g. module 91, and the terminal chamber cover 44 (FIG. 2) are provided with cooperating means for providing a staple for receiving the shackle of a padlock (e.g. padlock 148 of FIGS. 2 and 21 having shackle 149) to lock the individual security cover over the module upon the terminal chamber cover 44 being fastened to the enclosure 12 and, which cooperating means, upon the terminal chamber cover 44 being unfastened and open, permitting telephone company personnel to remove the locked padlock from the staple to permit the telephone company personnel to open the individual security cover 141. More particularly with regard to such cooperating means, and referring to FIG. 20, a security staple 150 including a lower portion 152 and an upper gooseneck portion 154 is provided. The lower portion 152 of the security staple 150 is mounted, such as by a suitable wedge fit, to the first end 96 of the module 91 and the upper gooseneck portion 154 includes a closed curved rearward portion 156 extending towards the module second end 97, an open forward portion 157, and an integrally formed lateral portion 158 disposed substantially perpendicular to the gooseneck portion 154. As best may be understood from FIG. 2, a downwardly extending portion 44A of the terminal chamber cover 44 is provided with a plurality of inwardly extending slots 271 . . . 295 (only slots 271 . . . 279 being shown in FIG. 2 but such slots will be equal in number to the plurality of modules 70) for receiving a forward portion 159 (FIG. 20) of the gooseneck portion 154 of the security staple 150 and for permitting sufficient of the closed curved rearward portion 156 of the gooseneck portion 154 to be exposed, note FIG. 23, upon the terminal chamber cover 44A being closed, to permit the closed curved rearward portion 156 of the staple to receive the padlock shackle 149 of the padlock 148 to lock the individual security cover 141 to the module 91 (FIG. 21). Upon the individual subscriber leaving or moving away and leaving the padlock 148 locked, it will be understood further that upon the terminal chamber cover 44 being unfastened from the backplate and opened by telephone company personnel by loosening the fasteners 47a and 47b (FIG. 1), the gooseneck portion 154 and lateral portion 158 of the security staple 150 is exposed to permit the telephone company personnel to remove the padlock shackle 149 from the gooseneck and lateral portions 154 and 158 while the padlock 148 remains locked and thereby open the individual security cover 141; it will be understood and appreciated that the padlock 148 can be removed as described by telephone company personnel by merely opening the terminal chamber cover 44 and that no other act or work operation is required to remove the padlock and open the individual security cover.

Figure 17:
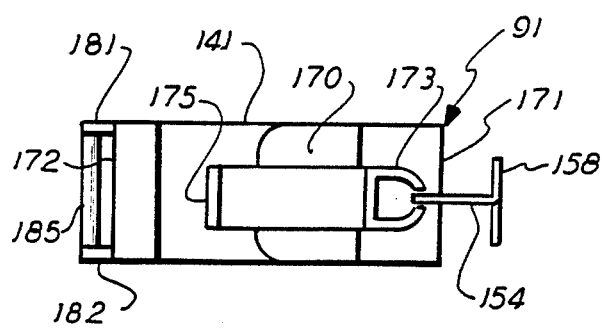
FIGS. 17, 18 and 19 are, respectively, top, side elevation, and right end views of an alternate embodiment of a replaceable individual subscriber line module embodiment the present invention and including a top security cover and a security lock staple.

It will be understood further, and referring particularly to FIGS. 17, 18, 21 and 22, that the top 170 of the individual security cover 141 is provided with opposed first and second ends 171 and 172 corresponding to the opposed first and second ends 96 and 97 of the module 91 and the security cover 141 is provided adjacent its first end 171 with an upwardly extending member 173 complementary in shape to the interior of the padlock shackle 149 and is provided intermediate its first and second ends 171 and 172 with an upwardly extending second member 175; upon the padlock 148 being locked the first member 173 is for receiving the padlock shackle 149 as shown in FIGS. 17 and 21 and the first 173 and second 175 members are for positioning the locked padlock 148 atop the individual security cover top 170; the member 175 also may be used to pivot the security cover 141 open.

Figure 18:
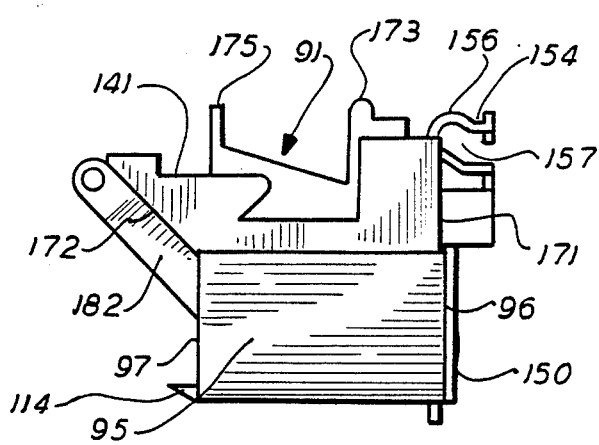
Figure 19:
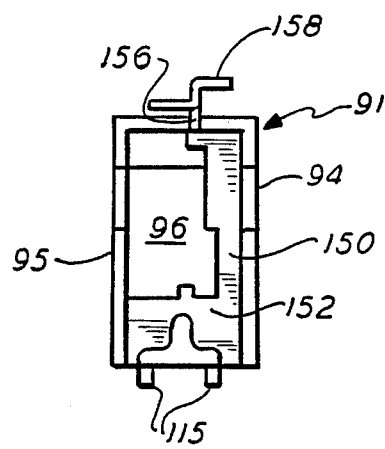
Figure 20:
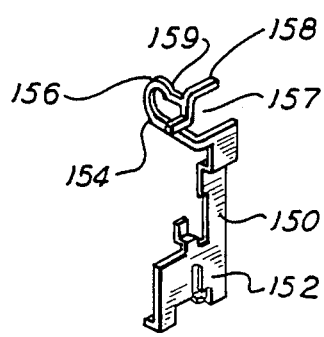
FIG. 20 is a perspective view of a security staple embodied in the replaceable individual subscriber line module of FIGS. 17, 18 and 19.

As may be understood further by reference to FIGS. 17, 18 and 22, the second end 97 of the module 91 is provided with a pair of generally upwardly and outwardly extending arms 181 and 182 having a shaft 185 extending therebetween and the second end 172 of the security cover 141 is provided with an outwardly extending U-shaped portion 189 for wedgedly and rotatably receiving the shaft 185 to thereby mount the security cover 141 pivotally on the second end 97 of the module 91.

As may be further understood, and referring to FIGS. 13 and 15, and particularly FIG. 15, a space 188 is provided between the arms 181 and 182 and shaft 185 sufficiently large to permit the individual subscriber wiring bridge 130 (FIG. 14) to pass through the space 188 and be removed from the module 91 while the individual subscriber line attached to the screw wire terminals 81 remains connected thereto whereby the individual module 91 may be discarded upon a component thereof, such as the telephone circuit received within the space 98 (FIG. 14) being non-functional; it being understood that the individual subscriber line (not shown) is first passed through the space 188 prior to connection to the subscriber terminals 81 of the wiring bridge 130.

As shown in FIG. 1A, the backplate 30 may be provided with a plurality of holes or openings 81–84 through which the above-noted construction and engineering personnel may insert screws, bolts, and the like to mount or attach the telephone network interface apparatus 10 to a suitable support surface such as for example a wall, or the like.

Referring again to FIG. 3, and in particular to the bottom portion thereof, it will be further understood that the telephone network interface apparatus 10 of the present invention, particularly the protector 18, may be provided with a bottom ground strap or connector 75 for connection to ground. As may be noted from FIG. 4, the bottom wall 38 is provided with an opening 75A through which the ground connector or strap 75 extends outwardly for connection by ground through a suitable bolt/clamp such as bolt/clamp 75B shown in FIG. 3.

In addition, to facilitate mounting of a plurality of telephone network interface apparatus 10 of the present invention at a single subscriber location to provide greater line capacity than a single telephone network interface apparatus 10 can provide, the upper portion of the connector 18, FIG. 3, is provided with a top ground connector or strap 76, having top and bottom ends, with the bottom end slidably connected to the top of the protector 18 by having an elongated opening 76a provided therein through which a bolt 76b extends; upon the ground connector 76 being slid downwardly as shown in FIG. 3, the bolt 76a is tightened to fasten the ground connector 76 in the downward position inside the enclosure 12 as shown in FIG. 3. However, for connection to the bottom ground strap of telephone network interface apparatus mounted vertically thereabove, it will be understood that the bolt 76b is loosened, the top ground connector is extended upwardly and outwardly of the enclosure 12 through and opening 76c formed in the top wall 36 as shown in FIG. 5, and the bolt 76b re-tightened.

Referring now to FIG. 11, there is illustrated, diagrammatically, a pair of telephone network interface apparatus of the present invention showing the manner in which a pair thereof may be vertically stacked or mounted at a single subscriber's location to provide the above-noted increased line capacity. In FIG. 11, it will be understood that telephone network interface apparatus 10 of the present invention is mounted to a suitable support surface as described above, and a second telephone network interface apparatus of the present invention, identified by general numerical designation 10A, is suitably mounted to the support surface above telephone network interface apparatus 10; for convenience of reference, the structure of telephone network interface apparatus 10A corresponding to structure in telephone network interface apparatus 10 is given the same numerical designation plus the letter A. In this arrangement, the upper ground connector 76 of lower telephone network interface apparatus 10 is loosened and slid upwardly and outwardly as described above for connection to the bottom ground strap 75A of upper telephone network interface apparatus 10A thereby continuing the ground connection from the bottom ground connector 75 of the lower telephone network interface apparatus 10 shown connected to a suitable ground. Cable stub 23A and splice connector 24A of the upper apparatus 10A are passed downwardly out of the splice chamber 14A of the upper apparatus 10A and through the cable guide 50A of the upper apparatus 10A. The end plate 60 (FIG. 10) of lower telephone network interface apparatus 10 is removed to permit the cable stub 23A and splice connector 24A to extend into the splice chamber 14 of the lower telephone network interface apparatus 10. Thus, it will be understood that a first plurality of incoming telephone lines may be "spliced out" or "dropped off" in the splice chamber 14 of lower telephone network interface apparatus 10 and interconnected with splice connector 24A of the upper telephone network interface apparatus 10A and to the telephone terminals 20A by cable stub 23A for subsequent interconnection with certain subscriber premises lines connected to the upper apparatus 10A in the manner noted above. Similarly, a second plurality of other incoming telephone lines included in the telephone network cable 15 will be "spliced out" or "dropped off" in the splice chamber 14 of the lower telephone network interface apparatus 10 and connected to splice connector 24 of the lower telephone network interface apparatus 10 and thereafter connected to the telephone terminals 20 by cable stub 23 of the lower telephone network interface apparatus 10. Accordingly, it will be understood that the lower telephone network interface apparatus 10 and the upper telephone network interface apparatus 10A are said to be stacked vertically. Alternatively, it will be understood that the telephone network cable 15 may be extended through and out of the lower splice chamber 14 and into the upper splice chamber 14A, whereupon a plurality of incoming telephone lines may be spliced out of the cable 15 into the upper splice chamber 14A for interconnection with upper connector 22A.

Figure 25:
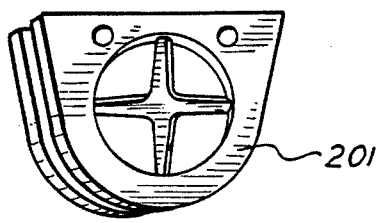
FIG. 25 is an enlarged view, in perspective, of a grommet.

Horizontal mounting or stacking of telephone network interface apparatus of the present invention to provide a single subscriber premises location with more line capacity than is provided by a single telephone network interface apparatus of the present invention is illustrated diagrammatically in FIG. 12. In this arrangement, telephone network interface apparatus 10 is suitably mounted to a support surface as noted above and telephone network interface apparatus 10B, also embodying the present invention, is inverted and mounted suitably to the support surface leftwardly of the telephone network interface apparatus 10; it will be understood that in actual practice apparatus 10 and 10B are mounted abutting but for clarity of description and understanding they are shown mounted separated. It will be understood that the splice chamber covers 43B and 43 of the leftward and rightward apparatus 10B and 10 are opened and the cable stub 23B is placed in the respective openings 41B and 41 (not shown but same as 41 in FIG. 6) formed in the respective side walls 40B and 40 and the splice connector 24B of the leftward apparatus 10B is inserted into the splice chamber 14 of the rightward apparatus 10 for interconnection with a plurality of incoming telephone lines "spliced out" or "dropped off" in splice chamber 14 of telephone network interface apparatus 10. Additionally, the splice connector 24 of telephone network interface apparatus 10 is interconnected to another plurality of incoming telephone lines included in telephone cable network 15 also "spliced out" or "dropped off" in splice chamber 14 of telephone network interface apparatus 10. Thereafter, the telephone network interface apparatus 10 and 10B function to connect the respective incoming telephone lines interconnected with splice connectors 24 and 24B to respective subscriber premises lines interconnected respectively to telephone network interface apparatus 10 and 10B in the manner described above. As illustrated in FIG. 6, the opening 41 in side wall 40 may be provided with a suitable grommet 201, the grommet 201 may be better seen in FIG. 25.

Referring lastly to FIG. 24, the dual hinging structure 45 will be described in detail. A plurality of spaced apart hinge members, e.g. 210a, 210b and 210c are suitably secured to the top of internal wall 42, a plurality of spaced apart hinge members, e.g. 212a and 212b are suitably secured to the right edge of the portion of the splice chamber door 43 adjacent the internal wall 42, and continuous hinge member 216 is suitably secured to the left edge of the portion of the terminal chamber door 44 adjacent the internal wall 42. Such hinge members are provided with outwardly extending cylindrical members as shown which cylindrical members are provided with holes or passageways extending therethrough as is also shown. The cylindrical members and the holes therethrough are linearly aligned as indicated by the arrows in FIG. 24 and a single rod 220 is inserted through the aligned holes thereby completing the dual hinging structure 45.

Lastly, referring again to FIGS. 1 and 3, the right lateral portion 32 of the back plate 30 may be provided with a plurality of subscriber premises cable or lines guides 230a, 230b and 230c, for guiding such cable or lines for interconnection with the above-described subscriber terminals 81 (FIG. 13) on the modules 91 (FIG. 13) of the plurality 70.

It will be further understood by those skilled in the art that many modifications and variations may be made in the present invention without departing from the spirit and the scope thereof.

What is claimed is:

1. Telephone network interface apparatus, comprising:
   a backplate of generally rectangular shape, said backplate divided generally into first and second lateral portions and an intermediate portion intermediate said lateral portions;
   said first lateral portion and said intermediate portion of said backplate provided with upwardly extending top and bottom walls, an upwardly extending side wall, and an upwardly extending internal wall parallel to and spaced from said side wall, first portions of said top and bottom walls, said side wall, said internal wall and said first lateral portion of said backplate cooperatively providing a splice chamber for receiving a telephone network cable including a plurality of incoming telephone lines, second portions of said top and bottom walls, said internal wall and said intermediate portion of said backplate cooperatively providing a terminal chamber having telephone terminals mounted therein, and said second lateral portion providing a network interface section provided with module mounting means;
   a plurality of replaceable, individual subscriber line modules mounted on said module mounting means, each module including an interface jack, a subscriber wiring bridge including a pair of subscriber terminals, an interface plug connected to said subscriber terminals for being removably received within said interface jack, and providing an internal space for receiving a telephone circuit, said interface jack for being connected to one of said telephone terminals and thereby to one of said incoming telephone lines and said subscriber terminals for being connected to a subscriber premises line, upon said interface plug being removed from said interface jack a demarcation point being provided between said one telephone line and said subscriber premises line whereby the plug of an operating telephone may be plugged into said interface jack to facilitate determination of whether a fault exists on said one of said incoming telephone lines or said subscriber premises line;
   a splice chamber door mounted pivotally on the top of said internal wall and for covering and closing said splice chamber and a terminal chamber door mounted pivotally on the top of said internal wall and for covering and closing said terminal chamber;
   first and second fastening means for respectively fastening said splice chamber door to said side wall and said terminal chamber door to said backplate to deny access to said chambers except for telephone company personnel;
   individual subscriber security means provided on each of said replaceable individual subscriber line modules for receiving a subscriber padlock to permit locking of each individual module against access to said interface plug, said interface jack and said subscriber wiring bridge by other subscribers, and telephone company personnel padlock override means provided on each of said individual modules for permitting said telephone personnel to override said individual subscriber padlock to gain access to said interface jack, said interface plug and said subscriber wiring bridge while said padlock remains locked;
   said first portion of said bottom wall cooperatively providing said splice chamber being provided with a first opening for permitting entrance of said telephone network cable into said splice chamber; and
   telephone network interface mounting means for mounting said apparatus on a support surface.

2. Telephone network interface apparatus according to claim 1 wherein said internal wall is provided with a second opening and wherein said apparatus further includes connecting means for extending through said second opening and for interconnecting said telephone terminals with predetermined ones of said telephone lines.

3. Telephone network interface apparatus according to claim 1 wherein said first portion of said top wall cooperatively providing said splice chamber is provided with a third opening for permitting entrance of second connecting means of second telephone network interface apparatus into said splice chamber for interconnection with second predetermined ones of said plurality of incoming telephone lines upon said second telephone network interface apparatus being mounted above said splice chamber.

4. Telephone network interface apparatus according to claim 1 wherein said side wall is provided with fourth opening for permitting entrance of second connecting means of second telephone network interface apparatus into said splice chamber for interconnection with second predetermined ones of said plurality of incoming telephone lines upon said second telephone network interface apparatus being mounted on said support surface adjacent said splice chamber.

5. Telephone network interface apparatus according to claim 3 wherein said portion of said bottom wall cooperatively providing said terminal chamber is provided with a fifth opening and wherein said apparatus further includes a bottom ground connector extending through said fifth opening, said bottom ground connector having first and second ends, said first end for being interconnected to the bottom of said telephone terminals and the other end for being connected to ground.

6. Telephone network interface apparatus according to claim 3 wherein said portion of said top wall cooperatively providing said terminal chamber is provided with a sixth opening and wherein said apparatus includes a top ground connector having first and second ends, said first end for being connected slidably to the top of said telephone terminals whereby said top ground connector may be extended outwardly through said sixth opening for interconnection with the bottom ground connector of said second telephone network interface apparatus.

7. Telephone network interface apparatus according to claim 1 wherein said apparatus further includes a reversible split telephone network cable guide for insertion into and occupation of said first opening, said cable guide including an outer portion complementary in shape to said first opening and provided with opposed inwardly extending grooves for receiving said first portion of said bottom wall cooperatively providing said splice chamber to secure said cable guide in said first opening, and said cable guide further including a cylinder portion for surrounding and guiding said telephone network cable into said splice chamber, said cable guide reversible to extend said cylindrical portion into said splice chamber to facilitate shipping of said apparatus and reversible to extend said cylindrical portion outwardly of said splice chamber to guide said telephone network cable into said splice chamber, and said cable guide being split generally longitudinally to permit said cable guide to surround said telephone network cable.

8. Telephone network interface apparatus according to claim 3 wherein said apparatus further includes a splice chamber end plate complementary in shape to and for insertion into and closing of said third opening, said end plate provided with opposed inwardly extending grooves for receiving said first portion of said top wall cooperatively providing said splice chamber to secure said end plate in said third opening.

9. Telephone network interface apparatus according to claim 1 wherein said top of said internal wall and adjacent portions of said splice chamber door and said terminal chamber door are provided with cooperative hinging means providing a common hinge about which said doors are pivotally mounted.

10. Telephone network interface apparatus according to claim 1 wherein said telephone terminals are protected telephone terminals provided with protection means for protecting said terminals against damage.

11. Telephone network interface apparatus according to claim 10 wherein said protection means are a plurality of lighting arrestors.

12. Telephone network interface apparatus, comprising:
  enclosure means providing a splice chamber for receiving a telephone network cable including a plurality of incoming telephone lines, a terminal chamber having lightning protectors and a plurality of pairs of telephone terminals mounted therein, and a network interface section having a plurality of interface jacks and pairs of subscriber terminals mounted thereon;
  an interface plug connected to each pair of said subscriber terminals and for being removably received within an associated one of said interface jacks, each of said interface jacks for being connected to one of said telephone terminals and thereby to one of said incoming telephone lines and each pair of said subscriber terminals for being connected to a subscriber premises line, upon each of said interface plugs being removed from its associated interface jack a demarcation point being provided between one of said telephone lines and one of said subscriber premises lines whereby the plug of an operating telephone may be plugged into said associated interface jack to facilitate determination of whether a fault exists on said one incoming telephone line or said one subscriber premises line;
  separate splice chamber and terminal chamber doors mounted pivotally on said enclosure means, said splice chamber door for covering and closing only said splice chamber and said terminal chamber door for covering and closing only said terminal chamber;
  first fastening means for fastening said splice chamber door closed only over said splice chamber and second fastening means for fastening said terminal chamber door closed only over said terminal chamber; and
  telephone network interface apparatus mounting means for mounting said apparatus on a support surface.

* * * * *